Aug. 25, 1964 W. J. CHORKEY 3,145,723
COMBINATION SHUTTLE-RELIEF VALVE
Filed June 9, 1961 2 Sheets-Sheet 1
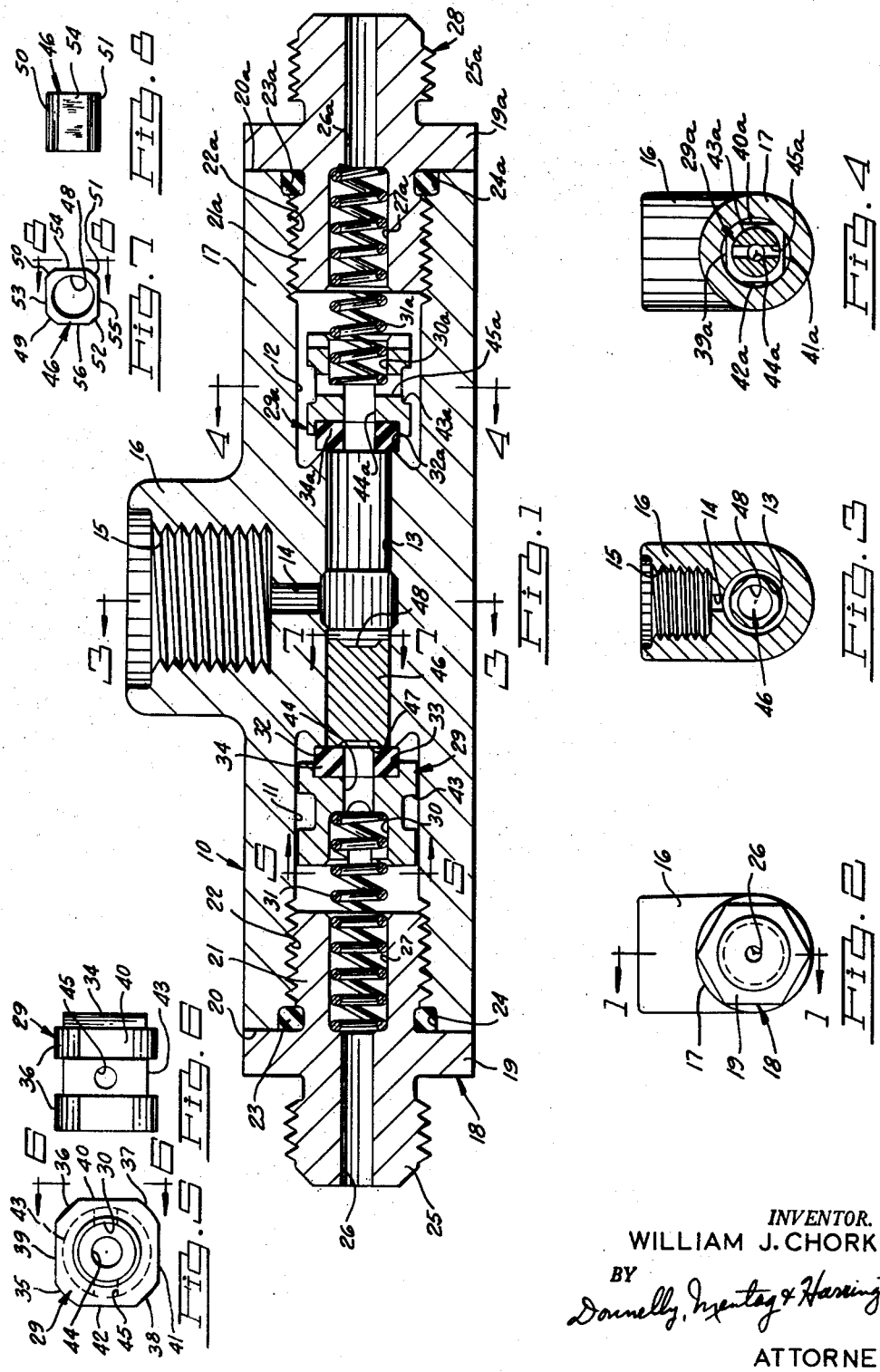
INVENTOR.
WILLIAM J. CHORKEY
BY
Donnelly, Mentag & Harrington
ATTORNEYS

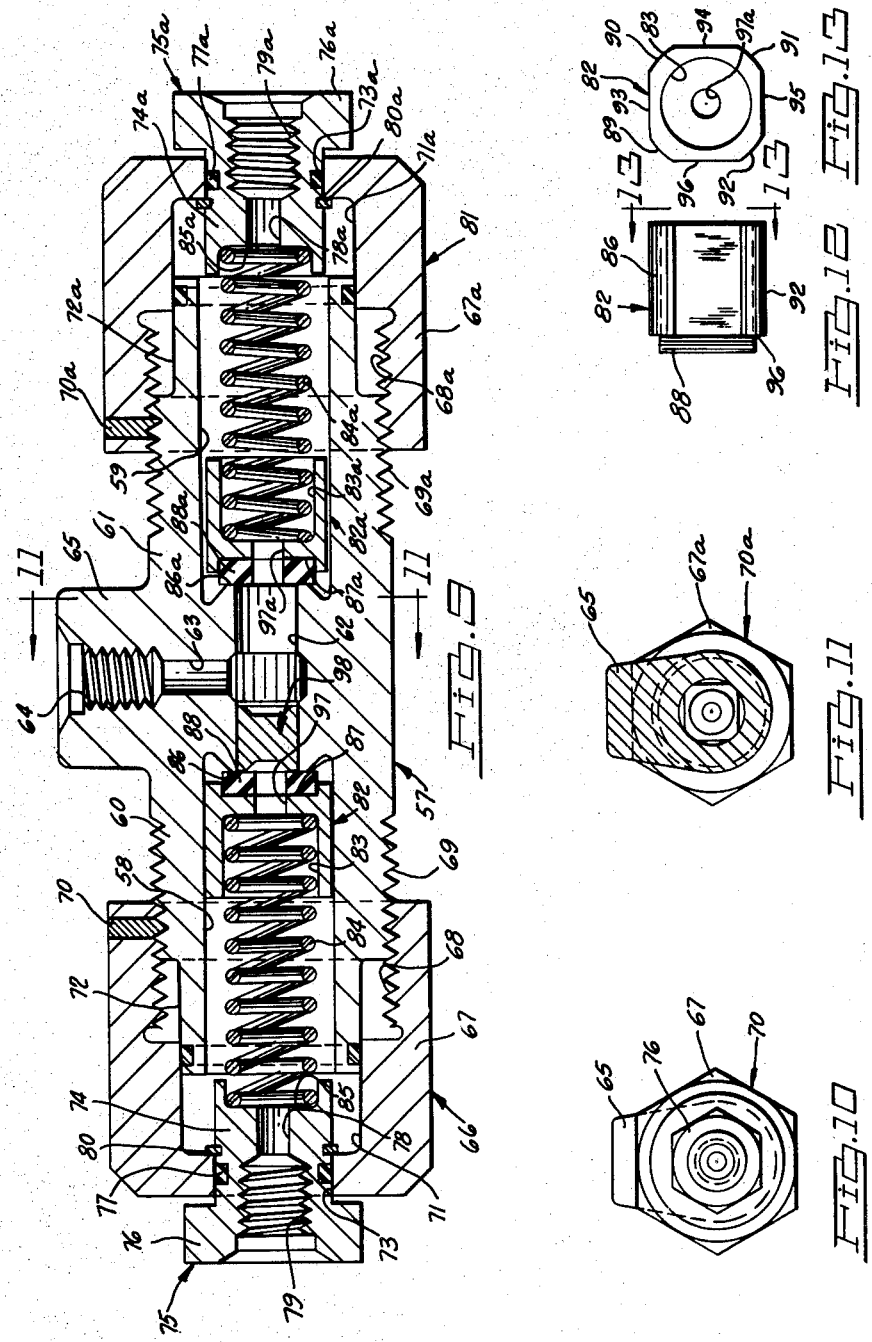

United States Patent Office 3,145,723
Patented Aug. 25, 1964

1

**3,145,723
COMBINATION SHUTTLE-RELIEF VALVE**
William J. Chorkey, Farmington, Mich., assignor to Bachan Manufacturing Co., Inc., Madison Heights, Mich., a corporation of Michigan
Filed June 9, 1961, Ser. No. 116,102
3 Claims. (Cl. 137—112)

This invention relates generally to the hydraulic valve art, and, more particularly, to a novel and improved combination shuttle and relief valve.

It is an important object of this invention to provide a combination shuttle and relief valve which incorporates a pair of relief valves in a single housing whereby the valve can be used in a hydraulic fluid pressure system with a minimum of plumbing and porting since there are only three connections required for installing the valve in such a system.

It is another object of this invention to provide a combination shuttle and relief valve which is constructed and arranged so that it may function as a shuttle valve as well as the dual acting relief valve.

It is a further object of the present invention to provide a combination shuttle and relief valve which may be constructed to operate at a pre-determined relief pressure or which may be constructed so that it can be adjusted to operate at different adjusted relief pressures.

It is still another object of the present invention to provide a combination shuttle and relief valve which is compact and simple in construction, economical of manufacture and efficient in operation.

It is still a further object of the present invention to provide a combination shuttle and relief valve which includes a single housing in which a pair of spaced apart, in-line relief valves are operatively mounted and which further includes an outlet port disposed between the aforementioned pair of valves. A movable shuttle valve member is seated in a conduit between the pair of valves and is adapted to be moved against one of the valves by fluid pressure to close off fluid flow through the same while permitting the fluid to flow through the other valve and out through the outlet port until pressure "build-up" required relief is provided as pre-determined by a valve spring seating against the closed off valve. At this point the closed off valve will be unseated and pressure will be relieved through this valve until the pressure "build-up" is relieved. The amount of fluid flow through the relief valves is controlled by a tubular orifice through the valves.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a central, longitudinal sectional view of a combination shuttle and relief valve made in accordance with the principles of the invention, taken along the line 1—1 of the structure shown in FIG. 2, and looking in the direction of the arrows;

FIG. 2 is a reduced, left-end elevational view of the structure illustrated in FIG. 1;

FIG. 3 is a reduced elevational, sectional view of the structure illustrated in FIG. 1, taken along the line 3—3 thereof, and looking in the direction of the arrows;

2

FIG. 4 is a reduced, elevational sectional view of the structure illustrated in FIG. 1, taken along the line 4—4 thereof, and looking in the direction of the arrows;

FIG. 5 is an end elevational view of the poppet structure employed in the valve of FIG. 1, taken along the line 5—5 thereof and looking in the direction of the arrows;

FIG. 6 is a side elevational view of the structure illustrated in FIG. 5, taken along the line 6—6 thereof and looking in the direction of the arrows;

FIG. 7 is a slightly reduced, end elevational view of the shuttle valve member employed in the valve of FIG. 1, taken along the line 7—7 thereof, and looking in the direction of the arrows;

FIG. 8 is a side elevational view of the structure illustrated in FIG. 7, taken along the line 8—8 thereof and looking in the direction of the arrows;

FIG. 9 is a central, longitudinal sectional view of a second embodiment of the invention;

FIG. 10 is a left end elevational view, slightly reduced, of the structure illustrated in FIG. 9;

FIG. 11 is a reduced, elevational sectional view of the structure illustrated in FIG. 9, taken along the line 11—11 thereof and looking in the direction of the arrows;

FIG. 12 is a side elevational view of a poppet valve member employed in the structure of FIG. 9; and, FIG. 13 is an end elevational view of the structure illustrated in FIG. 12 taken along the line 13—13 thereof and looking in the direction of the arrows.

Referring now to the drawings, and in particular to FIGS. 1 through 8, the first embodiment of the invention is shown and comprises an inverted T-shaped valve body or housing generally indicated by the numeral 10. As shown in FIG. 1, the valve includes a pair of longitudinally disposed coaxial valve chambers indicated by the numerals 11 and 12. The valve chambers 11 and 12 are formed in the ends of the valve housing and are interconnected by means of the passageway 13.

As shown in FIG. 1, the valve chambers 11 and 12 are located in the long elongated portion of the housing 10. The interconnecting passageway 13 communicates at the center or medial point thereof with the passageway 14 which is connected at its outer end to the outlet port 15. The port 15 is provided with conventional threads for the reception of fluid coupling or conduit means for connecting the valve in a hydraulic fluid pressure circuit. The outlet port 15 is located in the valve housing portion 16 which extends outwardly, perpendicularly, from the elongated housing portion 17.

As shown in FIGS. 1 and 2, the valve chamber 11 is located in the left end of the housing portion 17 and it is open from the outer end thereof. The outer end of the valve chamber 11 is enclosed by the cap generally indicated by the numeral 18. The cap 18 includes the flat hexagon portion 19 which is adapted to seat against the outer end 20 of the housing portion 17. The cap 18 further includes the integral inwardly extended centrally mounted threaded hub 21 which is adapted to be threadably engaged with the threaded end portion 22 of the chamber 11. A conventional sealing ring 23 is mounted in the annular recess 24 which is formed at the outer end of the chamber 11 whereby the sealing ring 23 is adapted to be engaged by the end cap portions 19 and 21. The end cap 18 is further provided with the integral outwardly extended axial male connector member 25 which is threaded on the circumference thereof for connection to a conventional fluid pressure circuit or system coupling means.

The valve chamber 11 communicates with the exterior of the valve by means of the connecting passages 26 and 27 which are formed through the end cap 18. As shown in FIG. 1 the passageway portion 27 is formed to a larger diameter than the passageway 26. The larger passageway 27 is formed in the end cap portion 21. As shown in FIG. 1, the valve chamber 12 is constructed similarly in size to the valve chamber 11 and is provided with a similar end cap generally indicated by the numeral 28. The similar parts of the end cap 28 which correspond to the parts of the end cap 18 are marked with the same reference numerals followed by the small letter "a." It will be seen that the passageways 26 and 26a form ports for communicating the valve chambers 11 and 12 with a fluid pressure system and that these ports are in coaxial alignment with each other.

Movably mounted in the valve chamber 11 is the poppet valve generally indicated by the numeral 29. The poppet valve 29 is provided on the rear end thereof with a recess or inwardly extended bore 30, as shown in FIGS. 1 and 5. A calibrated coil spring 31 is mounted in the chamber 11 and the inner end of this spring is seated in the bore 30. The outer end of the spring 31 is seated in the enlarged passageway 27 which is formed in the inner end of the cap portion 21. The spring 31 is adapted to normally bias the poppet valve 29 inwardly against the seat formed on the inner end wall of the chamber 11 around the passageway 13 and indicated by the numeral 32.

The poppet valve 29 is provided with an inwardly extended annular recess 33 on the inner end thereof. As shown in FIGS. 1 and 6, a sealing member 34 is fixedly mounted in the recess 33. The sealing member 34 is preferably an elastomer which is glued in place in the recess 33 by any suitable means, as by a glue called Eastman 910 adhesive which is available on the market and sold by the Tennessee Eastman Company, a division of Eastman Kodak Company. It will be understood that any other type sealing material may be used to carry out the function of the sealing member 34 which is adapted to abut the valve seat 32.

As shown in FIGS. 1, 5 and 6, the poppet valve 29 is provided with the four curved bearing surfaces 35, 36, 37 and 38 which are adapted to slidably engage the surface of the chamber 11. As best seen in FIG. 5, the poppet valve 29 is rotated 45° relative to FIG. 1 and is provided between said curved bearing surfaces with the flat surfaces 39, 40, 41 and 42 to provide passages through which fluid under pressure may pass. As shown in FIG. 6, the poppet valve 29 is provided with the annular recess 43 which is formed around the periphery of the poppet valve and which divides the aforementioned curved bearing surfaces and flat surfaces into spaced apart portions. As shown in FIG. 1, the poppet valve 29 is provided with the axial passage 44 which communicates at the rear end thereof with the recess 30 and which extends through the sealing member 34 and communicates at the forward end thereof or inner end thereof with the first passageway 13. The poppet valve 29 is further provided with the transverse passage 45 which communicates at the outer ends thereof with the annular groove 43 and at the inner ends with the axial bore 44.

The poppet valve 29a in the valve chamber 12 is constructed identically to the poppet valve 29 in the chamber 11, and the corresponding parts thereof have been marked with similar reference numerals followed by the small letter "a." It will be seen that the poppet valve 29a is shown as being turned 45° from the position of the poppet valve 29 so that one of the flat surfaces is positioned on the top and bottom sides thereof as viewed in FIG. 1.

As shown in FIGS. 1, 7 and 8, the shuttle valve is generally indicated by the numeral 46, and this valve is slidably mounted in the first passageway 13 which connects to the second passageway 14. The shuttle valve 46 is provided with the annular recesses 47 and 48 on the ends thereof. As best seen in FIG. 7, the shuttle valve 46 is provided with the circumferentially spaced apart curved bearing surfaces 49, 50, 51 and 52 which are adapted to be slidably mounted on the inner surface of the first passageway 13. The shuttle valve 46 is further provided with the flat surfaces around the periphery thereof between the curved surfaces, and these flat surfaces form fluid passages and are indicated by the numerals 53, 54, 55 and 56. It will be seen that the shuttle valve 46 is provided with a substantially circular end surface for engaging the sealing members 34 and 34a. The recesses 47 and 48 in the ends of the shuttle valve 46 allow the actual point of contact of the valve on the sealing members 34 and 34a to be ring shaped and of a minimum contacting area so that if foreign particles get into the fluid system, the chances of such foreign particles stopping the closing of the seals 34 and 34a are lessened because of the small contacting area of the ends of the valve 46.

When the valve shown in FIGS. 1 through 8 is installed in a fluid flow system, the outlet port 15 would be connected to an element to be supplied with fluid pressure at a predetermined pressure, and the fluid would be supplied either through the left-hand chamber 11 or the right-hand chamber 12. Assuming that the fluid under pressure is entering from the left-hand end of the valve as shown in FIG. 1, the fluid under pressure would flow through the inlet passage or port 26 and through the passageway 27 and the spring 31 and into the chamber 11. The main flow of fluid under pressure passes through the valve 29 by means of the axial bores 30 and 44. The fluid under pressure would then act upon the shuttle valve 46 and move it to the right as viewed in FIG. 1 against the sealing ring 34a on the poppet valve 29a. This action will permit the fluid under pressure to flow into the first passageway 13 and from there into the second passageway 14 and exit through the outlet port 15 and be passed on to the element to be supplied with the fluid under pressure.

The fluid under pressure will pass through the valve and out the outlet port 15 at a rate allowed by the axial bore or orifice 44, and at a pressure equal to a resistance or tension of the spring 31a which is maintaining the valve 29a against the seat 32a. If the pressure of the fluid builds up to a point whereby it is greater than the spring tension or resistance of the spring 31a, the poppet valve 29a in the valve chamber 12 will move to the right as viewed in FIG. 1 and be unseated from the valve seat 32a and a partial flow of the pressure fluid will take place into the valve chamber 12. The fluid under pressure will pass over the flat portions of the shuttle valve 46 and the poppet valve 29a and exit through the passageways 26a and 27a. The fluid under pressure will pass through the valve chamber 12 which is thus acting as a relief portion of the valve, and the flow will continue until the pressure fluid in the passageway 13 has lost sufficient pressure to permit the spring 31a to close the poppet valve 29a. It will be seen that the aforegoing action thus maintains any desired pressure in the fluid flow system. When the port 26a is used to exhaust the relieved pressure fluid from the first passageway 13, this port must be connected to the fluid reservoir or to the exhaust portion of the fluid flow system. It will be seen that the fluid under pressure may be led into the valve from the right-hand end thereof as viewed in FIG. 1, instead of from the left-hand end thereof as described hereinabove. In the last mentioned manner of using the valve the left-hand spring 31 would then provide the pressure to the poppet valve 29 which must be overcome by the pressure of the fluid to provide a relief action as described hereinabove.

Although the poppet valves 29 and 29a have been shown as made to the same size and cross sectional area, they need not be the same if the pressure requirements may be different. In such a case, one or the other of the poppet valves 29 and 29a would be made smaller or greater in cross sectional area, as desired, and the calibrated springs 31 and 31a would also be made to the proper smaller or larger size to provide the desired spring pressure on the poppet valve. It will also be understood that the axial bores or orifices 44 and 44a may be made to any desired size to provide the desired flow volume.

The second embodiment of the invention is disclosed in FIGS. 9 through 13, and this embodiment illustrates the application of the valve of the present invention in a construction wherein the means is provided for adjusting the tensions of the springs engaging the poppet valves. This second embodiment is provided with an inverted T-shaped valve body or housing generally indicated by the numeral 57. As shown in FIG. 9, the second embodiment includes the valve chambers 58 and 59 which are disposed longitudinally in the valve housing 57, and which are coaxially or in-line disposed. The valve chamber 58 is located in the left end of the housing portion 60 and the valve chamber 59 is located in the right end of the valve housing portion 61, as viewed in FIG. 9.

The valve chambers 58 and 59 are interconnected by means of the first passageway 62 and these valve chambers are open at the outer ends thereof. The interconnecting passageway 62 communicates at the central or medial point thereof with the passageway 63 which is connected at its outer end to the outlet port 64. The outlet port 64 is provided with conventional internal threads for the reception of fluid coupling means or conduit means for connecting the valve in a hydraulic fluid pressure circuit. The outlet port 64 is located in the valve housing portion 65 which extends outwardly, perpendicularly, from the elongated portion of the housing 57.

As shown in FIGS. 9 and 10, the valve chamber 58 is located in the left end of the housing portion 60, and the open outer end thereof is enclosed by the cap member generally indicated by the numeral 66. The cap 66 includes the cup-shaped portion 67 which has the internally threaded portion 68 which is adapted to be threadably mounted on the external peripheral threaded portion 69 of the left end of the valve housing portion 60. The cap 66 is adapted to be held in any adjusted threaded position on the valve housing portion 60 by means of the plastic-like material rods 70 which secure the adjusting cup-shaped nut portion 67 in place on the threads 69 in the valve housing portion 60. A lock member of this type which is suitable and which is available on the market is sold by the Nylok Company of Detroit, Michigan, and this locking member is sold under the trademark "Nylok."

As shown in FIG. 9, the end cap nut portion is further provided with the stepped inwardly disposed bore or annular recess 71 which is disposed inwardly of the threaded portion 68, and which is adapted to be slidably mounted on the circular periphery 72 of the left end portion of the valve housing 57. The valve housing portion 72 functions as a pilot surface for the end cap nut 67. As shown in FIG. 9, the end cap portion 67 is provided with the centrally or axially disposed circular opening 73 in which is mounted the inwardly extended shaft portion 74 of the connector fitting 75. The outer end of the connector fitting 75 is enlarged as indicated by the numeral 76, and is hexagonal in outer configuration. The connector fitting 75 is provided with the sealing ring member 77 which is adapted to seat in an annular groove around the connector fitting portion 74 and be sealingly engaged against the surfaces of the opening 73. The connector fitting 75 is provided with the orifice 78 to the inner end thereof and this orifice communicates with the threaded passage formed in the outer end thereof, and this threaded passage or bore is indicated by the numeral 79. The connector fitting 75 is releasably mounted in the end cap portion 67 by means of the conventional retainer clip 80.

As shown in FIG. 9, the right end adjustably mounted cap means 81 is constructed in the same manner as the cap means 66, and the corresponding parts are marked with the same reference numerals followed by the small letter "a."

As shown in FIG. 9, the poppet valve 82 is slidably mounted in the valve chamber 58 and is provided on the rear end thereof with a recess 83. A calibrated coil spring 84 is mounted in the chamber 58 and the inner end of this spring is seated in the bore 83. The outer end of the spring 84 is seated in the annular recess 85 which is formed in the inner end of the connector fitting portion 74. The spring 84 is adapted to normally bias the poppet valve 82 inwardly against the seat 86 formed on the inner end wall of the chamber 58 around the passageway 62.

The poppet valve 82 is provided with an inwardly extended annular recess 87 on the inner end thereof and seated therein is the sealing ring 88, which is the same as the sealing ring 34 of the first embodiment, and which operatively engages the seat 86. As shown in FIGS. 12 and 13, the poppet valve 82 is provided with the four peripheral curved bearing surfaces 89, 90, 91 and 92 which are adapted to slidably engage the inner surface of chamber 58. The poppet valve 82 is provided between the curved bearing surfaces with the flat surfaces 93, 94, 95 and 96 to provide passages through which fluid under pressure may pass. As shown in FIGS. 9 and 13, the poppet valve 82 is provided with the axial bore or orifice 97 which is constructed the same as the bore 44 in the poppet valve 29 of FIG. 1.

The shuttle valve 98 is constructed the same as the shuttle valve 46 of the first embodiment of FIG. 1. The poppet valve 82a in the right end valve chamber 59 is constructed in the same manner as the poppet valve 82 and the corresponding parts are marked with the same reference numerals followed by the small letter "a." The valve of FIGS. 9 through 13 functions in the same manner as the valve of FIGS. 1 through 8 with the difference being that the resistance of the springs 84 and 84a may be varied by means of the adjustably mounted end caps 66 and 81.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A combination shuttle and relief valve, comprising: a valve housing having a pair of valve chambers; a first passageway in said valve housing interconnecting the inner ends of said chambers; a valve seat formed on the inner end of each of said chambers around the interconnecting end of said first passageway; each of said chambers being provided with port means for admitting and exhausting fluid under pressure; a valve movably mounted in each of said chambers; a spring means in each of said chambers for normally biasing said valves against said seats; each of said valves being provided with an orifice therethrough for communicating said first passageway with the chamber in which each of the respective valves is disposed when the valve is seated on said seats; a movable shuttle valve member in said first passageway for selective closing of said valve orifices in accordance with the direction of fluid flow through said first passageway and the fluid pressures exerted thereon; an outlet port formed in said valve housing; a second passageway in said housing connecting said outlet port to said first passageway; said movable valves in said valve chambers each being provided with a sealing ring on the inner end thereof for engagement with said valve seats; said shuttle valve member being provided with an annular seat on each end thereof for sealing engagement with the sealing rings on the inner ends of said movable valves for overlapping and closing the orifices formed therethrough when the shuttle valve is moved by fluid pressure into engagement with the movable valves.

2. A combination shuttle and relief valve as defined in claim 1, wherein: said shuttle valve member is provided around the periphery thereof with a plurality of longitudinal relieved areas to form fluid passages to permit fluid under pressure to pass around the shuttle valve.

3. A combination shuttle and relief valve as defined in claim 2, wherein: said valve is provided with means for adjusting the resistance of said spring means.

References Cited in the file of this patent
UNITED STATES PATENTS

| | | |
|---|---|---|
| 788,986 | Zins | May 2, 1905 |
| 1,251,655 | Gunnarson | Jan. 1, 1918 |
| 1,353,951 | Frost | Sept. 28, 1920 |
| 2,190,352 | Crowley | Feb. 13, 1940 |
| 2,354,791 | Boldt | Aug. 1, 1944 |
| 2,955,613 | Block | Oct. 11, 1960 |
| 3,050,078 | Hooper | Aug. 21, 1962 |